United States Patent
Jin et al.

(10) Patent No.: US 10,262,391 B2
(45) Date of Patent: Apr. 16, 2019

(54) GRAPHICS PROCESSING DEVICES AND GRAPHICS PROCESSING METHODS

(71) Applicant: Samsung Electronics Co., Ltd., Suwon-si, Gyeonggi-do (KR)

(72) Inventors: Seunghun Jin, Suwon-si (KR); Santosh George Abraham, Pleasanton, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 3 days.

(21) Appl. No.: 15/603,987

(22) Filed: May 24, 2017

(65) Prior Publication Data

US 2018/0101929 A1    Apr. 12, 2018

(30) Foreign Application Priority Data

Oct. 10, 2016    (KR) ........................ 10-2016-0130832

(51) Int. Cl.
     *G06T 1/20*      (2006.01)
     *G06T 1/60*      (2006.01)
     *G06F 9/00*      (2006.01)

(52) U.S. Cl.
     CPC .................. *G06T 1/20* (2013.01); *G06F 9/00* (2013.01); *G06T 1/60* (2013.01)

(58) Field of Classification Search
     None
     See application file for complete search history.

(56) References Cited

U.S. PATENT DOCUMENTS

| | | | |
|---|---|---|---|
| 5,969,726 A | 10/1999 | Rentschler et al. | |
| 6,266,149 B1 | 7/2001 | Zandee | |
| 7,404,059 B1 * | 7/2008 | Nordquist | G06F 9/3851 711/168 |
| 7,593,971 B1 * | 9/2009 | Nordquist | G06F 9/3879 |
| 7,839,410 B1 * | 11/2010 | Brown | G06T 15/04 345/541 |
| 2004/0160450 A1 | 8/2004 | Doyle | |

(Continued)

FOREIGN PATENT DOCUMENTS

| | | |
|---|---|---|
| JP | 5436526 B2 | 3/2014 |
| JP | 5450624 B2 | 3/2014 |
| KR | 20150117522 A | 10/2015 |

*Primary Examiner* — Ryan M Gray
(74) *Attorney, Agent, or Firm* — Harness, Dickey & Pierce, P.L.C.

(57) ABSTRACT

A graphics processing unit (GPU) configured to perform a graphics pipeline may generate operation data based on base operation data representing a base state of a plurality of components and implement the plurality of components to perform the graphics pipeline according to the generated operation data. The GPU may determine a priority of a plurality of instances of state version data based on frequencies of use associated with the plurality of instances of state version data, maintain first state version data having a determined highest priority from among the plurality of instances of state version data, and control second state version data having a determined lower priority than the first state version data to be updated based on a graphics pipeline being performed. The state version data may include code associated with performing the graphics pipeline in each of a plurality of states of the plurality of components.

19 Claims, 13 Drawing Sheets

(56) References Cited

U.S. PATENT DOCUMENTS

| | | | |
|---|---|---|---|
| 2008/0012874 A1* | 1/2008 | Spangler | G06T 15/005 |
| | | | 345/582 |
| 2011/0087864 A1* | 4/2011 | Duluk, Jr. | G06F 9/30087 |
| | | | 712/220 |
| 2013/0120413 A1* | 5/2013 | Treichler | G06T 1/20 |
| | | | 345/506 |
| 2013/0141448 A1 | 6/2013 | Yokota et al. | |
| 2015/0294436 A1* | 10/2015 | Jin | G06F 12/00 |
| | | | 345/543 |
| 2016/0163015 A1* | 6/2016 | Riguer | G06F 9/449 |
| | | | 345/522 |
| 2017/0039754 A1* | 2/2017 | Oneppo | G06F 8/4441 |
| 2017/0075734 A1* | 3/2017 | Raman | G06F 9/52 |
| 2017/0148203 A1* | 5/2017 | Hakura | G06T 15/005 |
| 2017/0148204 A1* | 5/2017 | Hakura | G06T 11/40 |

\* cited by examiner

GRAPHICS PROCESSING DEVICES AND GRAPHICS PROCESSING METHODS

CROSS-REFERENCE TO RELATED APPLICATION

This application claims the benefit, under 35 U.S.C. § 119, of Korean Patent Application No. 10-2016-0130832, filed on Oct. 10, 2016, in the Korean Intellectual Property Office, the disclosure of which is incorporated herein in its entirety by reference.

BACKGROUND

1. Field

The present disclosure relates to graphics processing devices and graphics processing methods.

2. Description of the Related Art

Graphics processing devices, such as graphics processing units (GPUs), may render graphics data in computing apparatuses. Generally, a graphics processing device may generate a display frame by converting graphics data corresponding to 2-dimensional (2D) or 3D objects to a 2D pixel expression. Examples of a computing apparatus include not only a PC, a laptop, and a video game console, but also an embedded device, such as a smart phone, a tablet device, and a wearable device. In a case of the embedded device, such as a smart phone, a tablet device, and a wearable device, it may be difficult to obtain the same graphics processing performance as that of a workstation, such as a PC, a laptop, and a video game console, which have sufficient memory spaces and processing power, due to relatively low operation processing capability and high power consumption of the embedded device. However, according to the recent worldwide use of portable devices, such as smart phones or tablet devices, worldwide, the numbers of users playing games or watching content, such as movies or series, on smart phones or tablet devices, has rapidly increased. Consequently, manufacturers of graphics processing devices have conducted many studies to increase the performance and throughput of the graphics processing devices even in embedded devices so as to keep up with user demand.

SUMMARY

Some example embodiments are directed to graphics processing devices and methods of performing a graphics pipeline therein.

Some example embodiments are directed to a non-transitory computer-readable recording medium having recorded thereon a program for executing a graphics processing method.

Additional aspects will be set forth in part in the description which follows and, in part, will be apparent from the description, or may be learned by practice of the presented example embodiments.

According to some example embodiments, a graphics processing unit (GPU) may include a memory configured to store a computer-executable instruction and at least one processor. The at least one processor may be configured execute the computer-executable instruction to generate operation data associated with a graphics pipeline based on base operation data associated with a base state of a plurality of components, and implement the plurality of components to perform the graphics pipeline according to the generated operation data.

According to some example embodiments, a GPU may include a memory and at least one processor. The memory may be configured to store a plurality of instances of state version data including a code associated with performing a graphics pipeline in each of a plurality of states of a plurality of components. The at least one processor may be configured to execute a computer-executable instruction stored in the memory to determine a priority of the plurality of instances of state version data based on frequencies of use associated with the plurality of instances of state version data, maintain first state version data having a determined highest priority from among the plurality of instances of state version data stored in the memory, and control second state version data having a determined lower priority than the first state version data to be updated based on a graphics pipeline being performed.

According to some example embodiments, a method of operating a graphics processing unit (GPU) may include generating base operation data associated with a base state of a plurality of components based on state change frequencies of the plurality of components, generating operation data including a code associated with performing the graphics pipeline in a particular state of the plurality of components based on the base operation data, and performing the graphics pipeline according to the generated operation data. The GPU may be configured to implement the plurality of components to perform a graphics pipeline.

According to some example embodiments, a GPU may include a memory configured to store a computer-executable instruction and a processor. The processor may be configured execute the computer-executable instruction to control a plurality of instances of state version data associated with performing a graphics pipeline in a plurality of states of a plurality of components. The controlling may include maintaining first state version data having a determined frequency of use, associated with the plurality of instances of state version data, that at least meets a threshold frequency value, and updating second state version data based on a graphics pipeline being performed, the second state version data having a determined frequency of use that is less than the threshold frequency value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
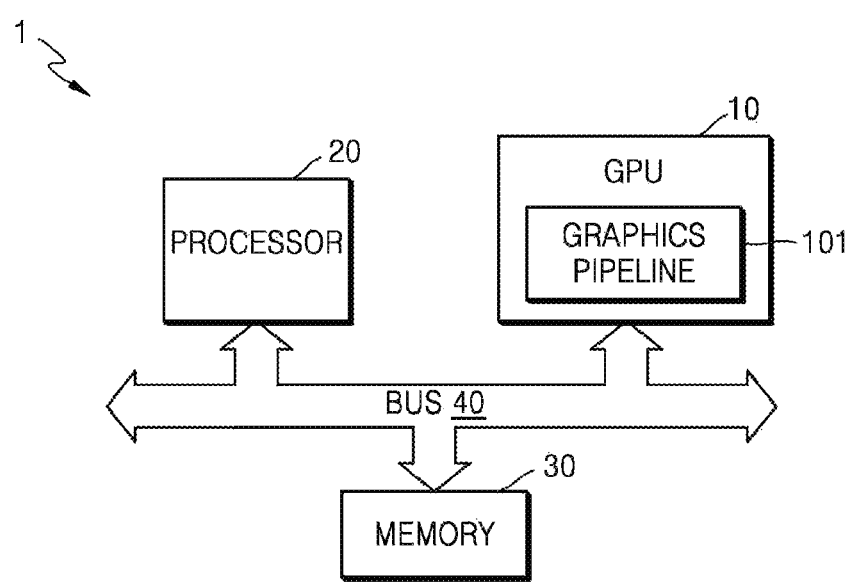
FIG. 1 is a block diagram of a computing system according to some example embodiments.

Hereinafter, some example embodiments will be described in detail with reference to the accompanying drawings. However, the inventive concepts are not limited thereto. Like reference numerals refer to like elements throughout.

The terms used in this specification are those general terms currently widely used in the art in consideration of functions regarding the present inventive embodiments, but the terms may vary according to the intention of those of ordinary skill in the art, precedents, or new technology in the art.

Also, specified terms may be selected by the applicant, and in this case, the detailed meaning thereof will be described in the detailed description of the inventive embodiments. Thus, the terms used in the specification should be understood not as simple names but based on the meaning of the terms and the overall description of the inventive embodiments.

It will be understood that, although the terms first, second, etc. may be used herein to describe various elements, these elements should not be limited by these terms. These terms are only used to distinguish one element from another. Thus, a first element, component, region, layer or section discussed below could be termed a second element, component, region, layer or section without departing from the teachings of the inventive concepts. As used herein, the term "and/or" includes any and all combinations of one or more of the associated listed items.

In the present specification, the terms such as "comprise" or "include" should not be construed as necessarily including various elements or processes described in the specification, and it should be construed that some of the elements or the processes may not be included, or additional elements or processes may be further included. It will be further understood that the terms "comprises," "includes," "including," and/or "comprising" when used in this specification, specify the presence of stated features, integers, steps, operations, elements, and/or components, but do not preclude the presence or addition of one or more other features, integers, steps, operations, elements, components, and/or groups thereof.

The terms used in this application, only certain embodiments have been used to describe, is not intended to limit the present embodiments. As used herein, the singular forms "a", "an", and "the" are intended to include the plural forms as well, unless the context clearly indicates otherwise.

Hereinafter, example embodiments will be described in detail with reference to the accompanying drawings. Since the example embodiments are related to methods and devices for processing a graphics pipeline, a detailed description of matters obvious to one of ordinary skill in the art will not be given herein.

FIG. 1 is a block diagram of a computing system according to some example embodiments.

Referring to FIG. 1, a computing system 1 may include a graphics processing unit (GPU) 10, a processor 20, a memory 30, and a bus 40. The GPU 10 and the processor 20 are processing devices that may each include various devices. One or more of the GPU 10 and the processor 20 may be a processing device ("processing circuitry") that is a central processing unit (CPU), a controller, or an application-specific integrated circuit (ASIC), that when, executing instructions ("program of instructions," "computer-executable instruction," etc.) stored in the memory 30, configures the processing device as a special purpose computer to perform the operations of one or more of the elements described herein, including operations of the GPU 10.

In FIG. 1, only elements of the computing system 1 related to the example embodiments are illustrated. Accordingly, it is to be understood by those skilled in the art that other general-purpose elements may be further included in the computing system 1 in addition to the elements shown in FIG. 1.

Examples of the computing system 1 include, but are not limited to, a desktop computer, a notebook computer, a smartphone, a personal digital assistant (PDA), a mobile media player, a video game console, a television set-top box, a tablet device, an e-book reader, a wearable device, etc. The computing system 1 may further include various devices.

Processing devices such as the GPU 10 and the processor 20 are hardware configured to process various operations. The processor 20 may be one or more instances of hardware configured to control general functions of the computing system and may control the GPU 10 and the memory 30 that are different elements. The processor 20 may perform various types of operations to control functions of the computing system 1. The GPU 10, in order to process 3D or 2D graphics data, may be an instance of hardware configured to control (also referred to herein as "implement" and/or "execute") a graphics processing function of the computing system 1. According to some example embodiments, the GPU 10 may perform operations (for example, a shading operation or a texturing operation) related to a graphics pipeline 101 while performing various types of graphics pipelines 101, such as open graphic(s) library (OpenGL), DirectX, compute unified device architecture (CUDA), and the like.

The memory 30 may be RAM such as dynamic RAM (DRAM) or static RAM (SRAM), or may be a device such as read-only memory (ROM) or electrically erasable programmable ROM (EEPROM). That is, the memory 30 may be a device that may store data processed in the GPU 10 or processor 20, or providing data to be processed in the GPU 10 or processor 20. According to some example embodiments, the memory 30 may store or provide pieces of data (e.g., "instances of information", "instances of data," etc.) related to texturing. Such data may include one or more computer-executable programs of instruction (also referred to herein as one or more computer-executable instructions) that may, when executed by a processing device (e.g., processor 20 and/or GPU 10) to cause the processing device to perform one or more operations. In some example embodiments, as referred to herein, a graphics pipeline 101 may include may include an operation that may be performed by the GPU 10 and/or processor 20.

The bus 40 is hardware that connects other pieces of hardware in the system 1 such that the other pieces of hardware transmit or receive data to or from each other. Examples of the bus 40 include a peripheral component interconnect (PCI) bus and a PCI express bus.

Figure 2:
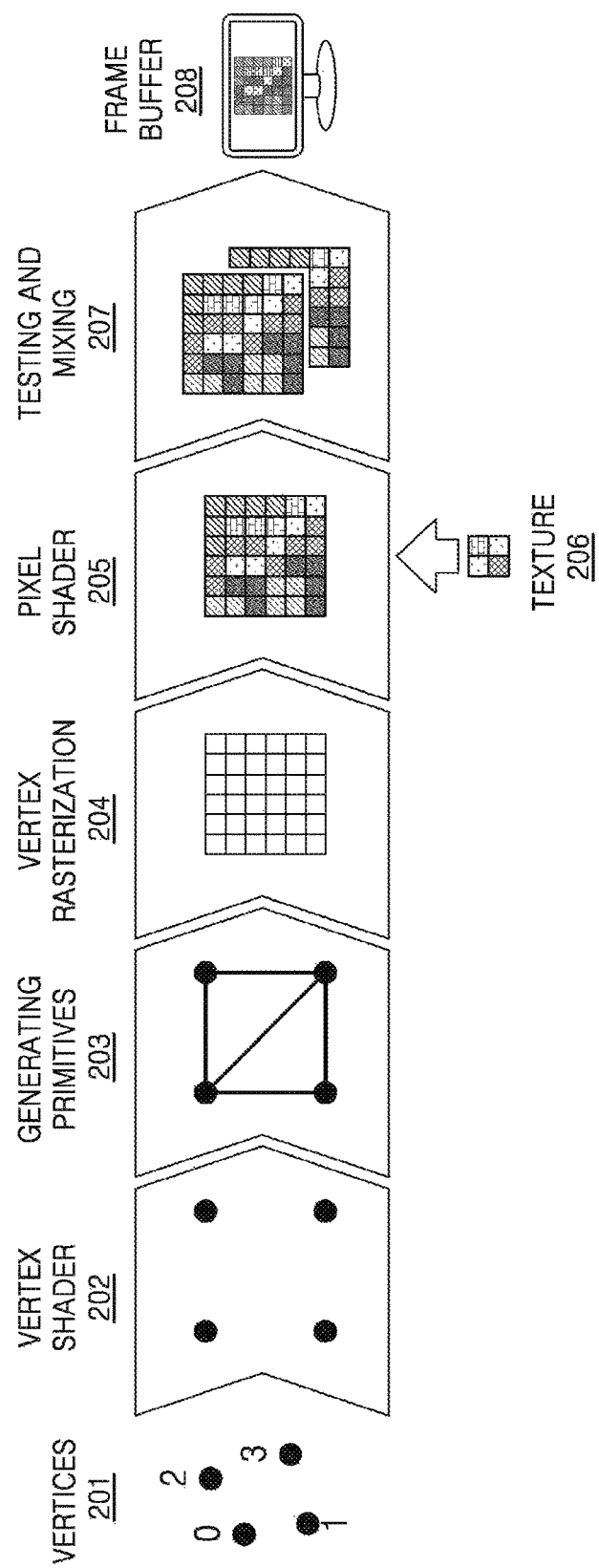
FIG. 2 is a view of a graphics pipeline processed by a graphics processing unit (GPU) according to some example embodiments.

FIG. 2 is a view of a graphics pipeline processed (e.g., "implemented," "executed," etc.) by a GPU according to some example embodiments. As noted above, the graphics pipeline may be an operation, set of operations, etc. that may be performed by the GPU 10 and/or processor 20 illustrated and described above with reference to FIG. 1.

Referring to FIG. 2, the overall process of the graphics pipeline 101 (of FIG. 1) may be roughly divided into geometry conversion, rasterization, and pixel shading operations, some or all of which may be implemented by the GPU 10 and/or processor 20 illustrated and described above with reference to FIG. 1.

Operation 201 is an operation of generating vertices. The vertices may be generated to represent objects included in 3D graphics (e.g., in a 3D environment). For example, operation 201 may include, based on processing information associated with a 3D object included in a 3D environment, a set of vertices that represent a boundary, "surface," etc. of the 3D object. The generated set of vertices may include a "point cloud" representation of an object.

Operation 202 is an operation that includes vertex shading the generated vertices. A vertex shader may perform vertex shading by determining locations of the vertices generated in operation 201.

Operation 203 is an operation that includes generating primitives associated with at least some of the generated vertices. A primitive refers to a point, a line, or a polygon formed according to at least one vertex. As an example, generating a primitive may include forming a triangle by connecting three vertices.

Operation 204 is an operation that includes rasterizing the generated primitives. Rasterizing the primitives refers to, with regard to at least one primitive, dividing the primitive into a plurality of fragments. The fragment may be a basic unit associated with performing graphics processing on the primitive, including a pixel. Since the primitive includes only information associated with vertices, 3D graphics processing may be performed by generating fragments between the vertices by the rasterizing.

Operation 205 is an operation that includes shading pixels of a rasterized primitive. The fragments at least partially comprising the rasterized primitive may correspond to pixels on a screen space. In the relevant art, the terms "fragment" and "pixel" are used in a mixed manner in some cases. For example, the pixel shader may be referred to as a fragment shader. In general, a basic unit of graphics processing constituting a primitive may be referred to as a fragment, and a basic unit of graphics processing performed by pixel shading may be referred to as a pixel. Values and attributes (for example, the color of a pixel) of pixels may be determined by pixel shading.

Operation 206 is a texturing operation including determining the color of a pixel. Texturing is a process of determining the colors of pixels by using prepared textures. The color of each pixel needs to be calculated and determined in order that various colors and patterns are represented in pixels. The GPU 10 may determine the colors of pixels by using prepared textures. Textures having various resolutions may be determined and prepared in advance to adaptively correspond to a size of an object to be illustrated in some pixels. The textures determined in advance and having different resolution values are referred to as a mipmap.

Operation 207 is a testing and mixing operation. Determined are pixel values to be finally displayed through a depth test, curling, or clipping.

Operation 208 is an operation including storing the frame generated through operations 201 to 207 in the frame buffer and displaying the frame stored in the frame buffer through a display unit.

Description of the concept of the graphics pipeline 101 described above in FIG. 2 is general, and more detailed processes will be understood by those of ordinary skill in the art.

Figure 3:
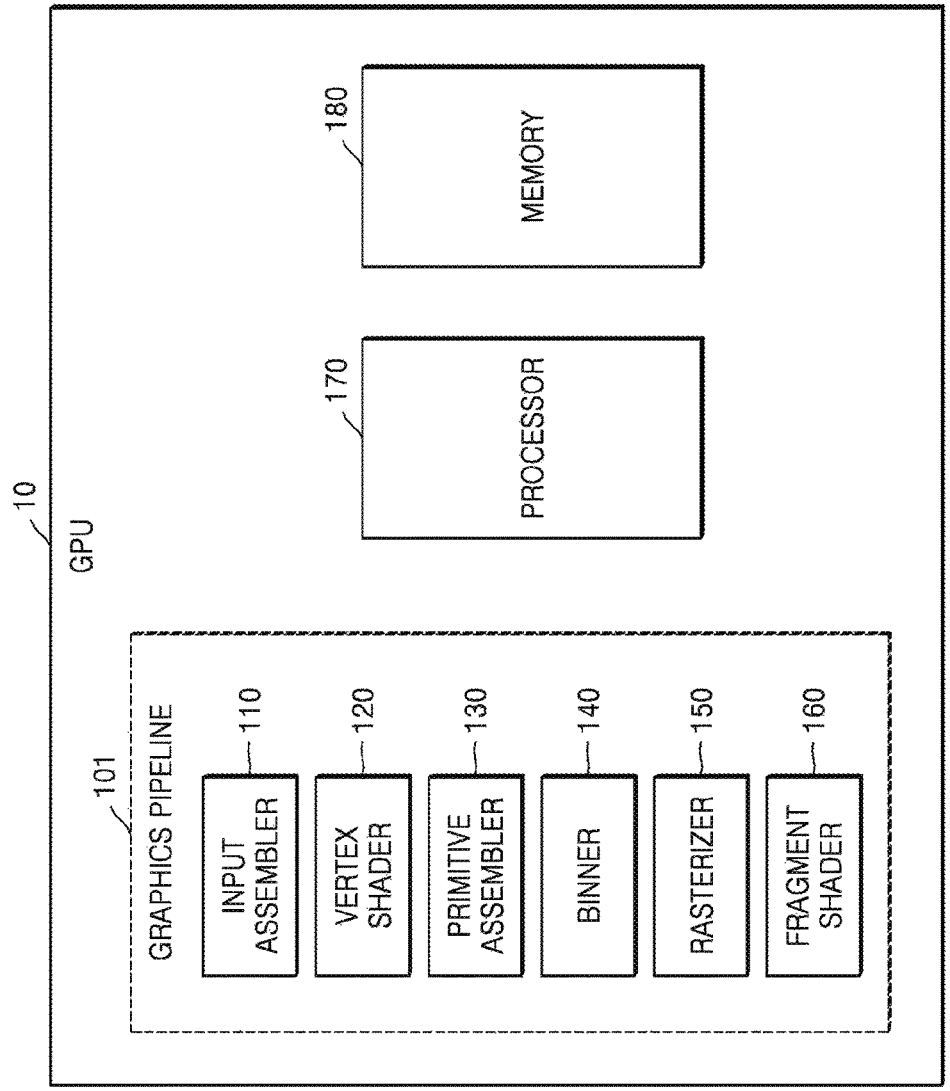
FIG. 3 is a block diagram illustrating a detailed hardware structure of the GPU of FIG. 1, according to some example embodiments.

FIG. 3 is a block diagram illustrating a detailed hardware structure of the GPU of FIG. 1, according to some example embodiments. The elements of the graphics pipeline 101 shown in FIG. 3 may be implemented by one or more instances of hardware, including the GPU 10 (including the processor 170 and memory 180) and/or processor 20 illustrated and described above with reference to FIG. 1.

Referring to FIG. 3, the GPU 10 may include an input assembler 110, a vertex shader 120, a primitive assembler 130, a binner 140, a rasterizer 150, and a fragment shader 160, which may be implemented by the GPU 10 to perform the graphics pipeline 101. Furthermore, the GPU 10 may further include a processor 170 and a memory 180. The above elements that perform the graphics pipeline 101 within the GPU 10 may be those classified based on functions to be described below. Therefore, the above elements that may be implemented (e.g., implemented based on processor 170 executing a program of operations stored at the memory 180) to cause the GPU 10 to perform the graphics pipeline 101 may be implemented by program logics or software modules, which respectively perform the functions to be described below. In some example embodiments, the above elements that may be implemented to perform the graphics pipeline 101 may be implemented by sub processing units (or processor cores) included in the GPU 10. That is, implementation types of the above elements that perform the graphics pipeline 101 may not be particularly limited to any one implementation type. The names of the above elements that perform the graphics pipeline 101 may be given based on the functions to be described below, but it will be understood by those of ordinary skill in the art that the names may be variously changed.

Names defined by the OpenGL are used for the elements that perform the graphics pipeline 101 within the GPU 10 for convenience of description, but the names of the elements are not limited thereto. That is, the elements that perform the graphics pipeline 101 within the GPU 10 may variously correspond to similar elements defined in various types of APIs, such as Microsoft's DirectX 11 (DX11) or Compute Unified Device Architecture (CUDA) 6.0.

The input assembler 110 may supply data of the vertices associated with objects stored in the memory 30 (of FIG. 1) to the graphics pipeline 101, based on the input drawcalls. The vertices supplied by the graphics pipeline 101 may be related to a mesh or a patch that is an expression of a surface, but are not limited thereto. The drawcall is a command indicating a frame on which an object is to be rendered and the object to be rendered on the frame. For example, the drawcall may be a command for drawing primitives, such as triangles or rectangles, on an image or a frame.

The vertex shader 120 transmits the vertices supplied by the input assembler 110 to the graphics pipeline 101 as input control points of the control shader 121.

When a tessellation pipeline 300 operation is performed by the GPU 10, the primitive assembler 130 may convert the tessellated vertices into primitives (i.e., tessellated primitives). When the tessellation pipeline 300 is not performed, the primitive assembler 130 may convert the vertices output from the vertex shader 120 into primitives.

The binner 140 may perform binning or tiling by using the primitives (or tessellated primitives) output from the primitive assembler 130. That is, the binner 140 may generate (bin) a tile list indicating information about ("associated with") tiles to which output primitives respectively belong by performing a depth test (or tile Z test).

The rasterizer 150 may convert the output primitives into pixel values of a 2D space based on the generated tile list. A fragment may mean pixels covered by the primitives. The fragment shader 160 may generate the primitives and determine a depth value, a stencil value, a color value, and the like of the fragment. A shading result of the fragment shader 160 may be stored in the memory 180 (e.g., frame buffers) and may be displayed as a frame of a video.

The processor 170 may control overall operations and functions of the elements 110 to 160 of the graphics pipeline 101 and the memory 180. The processor 170 may execute a program of instructions stored at the memory 180 to implement one or more of the elements ("modules") of the graphics pipeline 101 as shown in FIG. 3.

Figure 4:
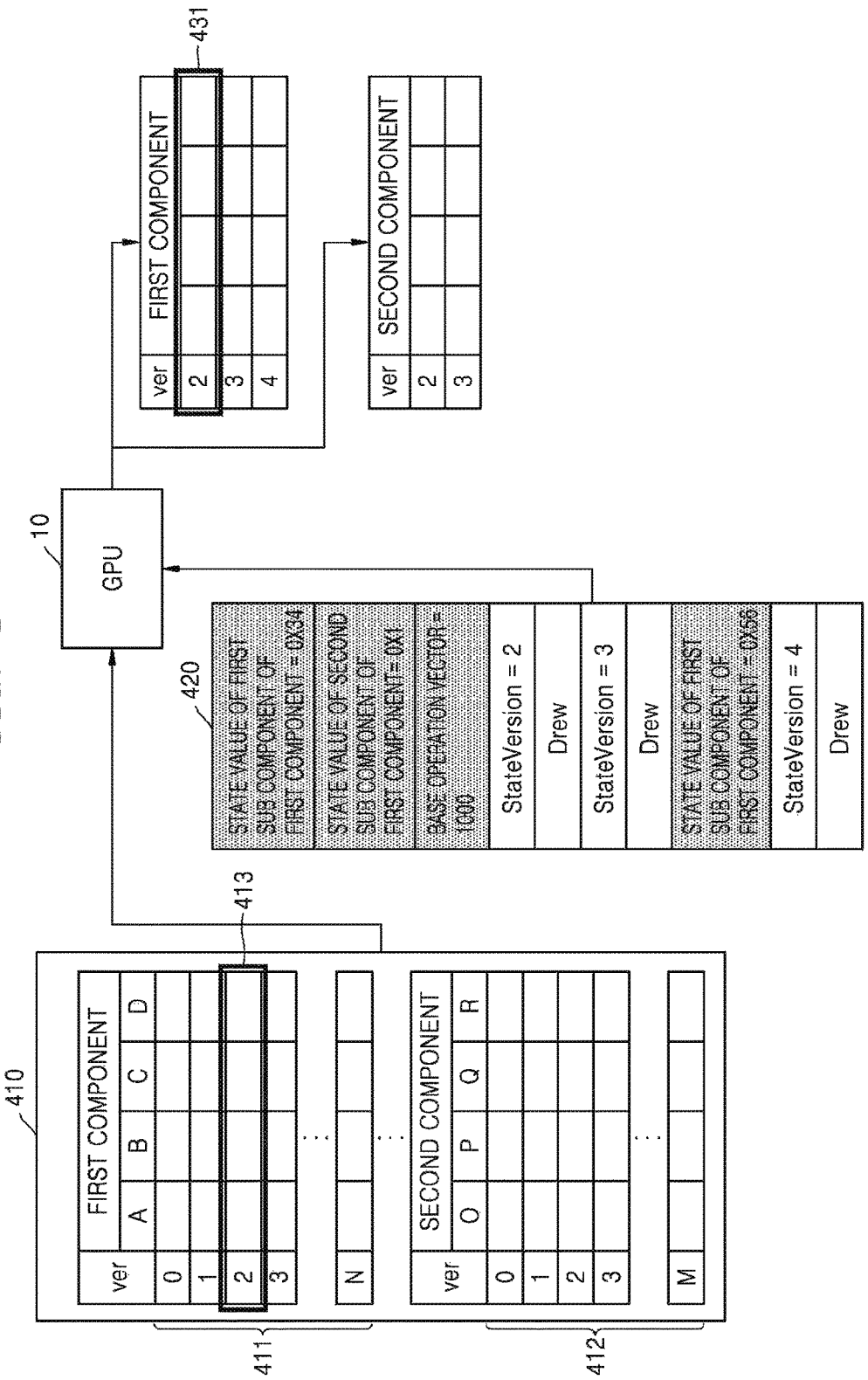
FIG. 4 is a conceptual diagram illustrating a method of operating a GPU according to some example embodiments.

FIG. 4 is a conceptual diagram illustrating a method of operating a GPU according to some example embodiments. One or more of the operations shown in FIG. 4 may be performed by the GPU 10 and/or processor 20 illustrated and described above with reference to FIG. 1.

The GPU 10 may store each piece of operation data 411 and 412 corresponding to a plurality of components in a memory 410 per state. The memory 410 may be an internal memory or an external memory of the GPU 10 (e.g., memory 180 or memory 30, respectively). Furthermore, each of the plurality of components (e.g., instances of data stored in a memory) may include a plurality of sub components. Pieces (e.g., "instances") of operation data of the plurality of sub components corresponding to the plurality of components may also be stored in the memory 410 per state. The memory 410 may be an internal memory or an external memory.

The GPU 10 may perform a graphics pipeline (e.g., graphics pipeline 101) by using the pieces of operation data 411 and 412 of the plurality of components and an instruction stream 420. As referred to herein, each "component" of the plurality of components may include a particular set of data that may be processed by the GPU 10 and/or the processor 20 to "implement" the component to at least partially perform a graphics pipeline. In some example embodiments, a component may refer to a particular portion of data stored in the memory 180 (e.g., a particular storage space associated with the memory 180) and processed by the processor 170 to at least partially perform the graphics pipeline. Each of the plurality of components in the GPU 10 may be implemented by the GPU 10 to perform a graphics pipeline based on the instruction stream 420. For example, the GPU 10 may obtain first operation data 413 used for performing a graphics pipeline from among the pieces of operation data 411 and 412 of the plurality of components, according to the instruction stream 420. The GPU 10 may generate second operation data 431 used by the GPU 10 to perform a graphics pipeline based on the first operation data 413 and the instruction stream 420. Each component of the plurality of components in the GPU 10 may be implemented to cause the GPU 10 to perform a graphics pipeline according to the second operation data 431.

Figure 5A:
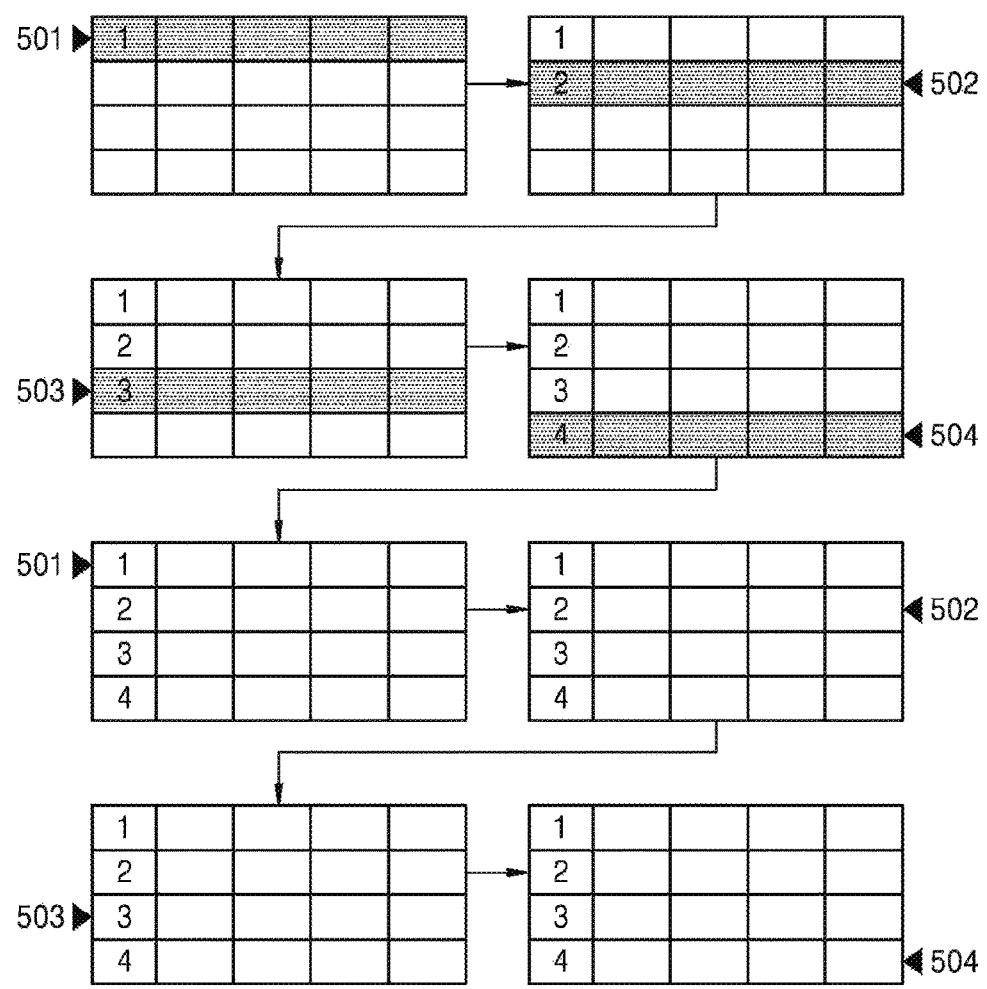
FIGS. 5A and 5B are views illustrating a process of a first component of a GPU performing a graphics pipeline by using operation data stored in a particular (or, alternatively, predetermined) storage space, according to some example embodiments.
Figure 5B:
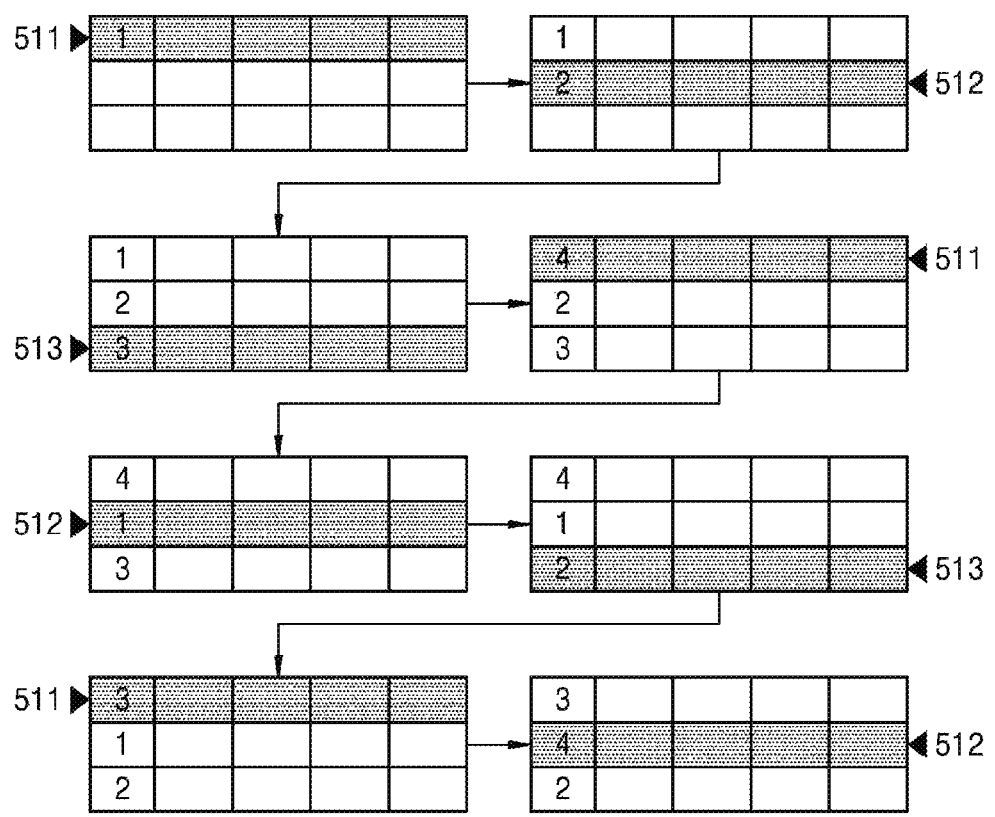

FIGS. 5A and 5B are views illustrating a process of a first component of a GPU being implemented by the GPU to perform a graphics pipeline by using operation data stored in a particular (or, alternatively, predetermined) storage space, according to some example embodiments.

The first component of the GPU may include first to fourth sub components. The first component may be processed by the GPU to perform a graphics pipeline according to a draw instruction.

Operation data including an operation code of the first component with respect to the draw instruction may be stored in a particular (or, alternatively, predetermined) allocated space in a memory. The particular (or, alternatively, predetermined) allocated space may be an internal memory or an external memory of the GPU. Furthermore, the particular (or, alternatively, predetermined) allocated space may be an inner space of a component.

It is assumed that the first component of the GPU may be implemented to perform a graphics pipeline by using pieces of operation data in the order of first operation data, second operation data, third operation data, fourth operation data, first operation data, second operation data, third operation data, and fourth operation data, according to a plurality of draw instructions.

As illustrated in FIG. 5A, it is assumed that the particular (or, alternatively, predetermined) allocated space, in which operation data used for performing a graphics pipeline is stored, may store only four pieces of state version data. Since the particular (or, alternatively, predetermined) allocated space may store four pieces of state version data, the first to fourth pieces of operation data are sequentially stored in first to fourth spaces of a memory 501 to 504, and pieces of operation data stored in the first to fourth spaces 501 to 504 may be sequentially used next. If a space of a memory is sufficient to store necessary operation data according to a draw instruction, the GPU may shortly perform a graphics pipeline according to the draw instruction without separate traffic. As a result, the GPU may be caused to perform the graphics pipeline with improved efficiency and speed, thereby enabling a computing system that includes the GPU to operate to perform graphics rendering and display, via a graphics pipeline, with improved efficiency and improved performance.

As illustrated in FIG. 5B, it is assumed that the particular (or, alternatively, predetermined) allocated space of the memory, in which operation data used for performing a graphics pipeline is stored, may store only three pieces of state version data. Since the particular (or, alternatively, predetermined) allocated space may store three pieces ("instances") of state version data, the first to third pieces of operation data are sequentially stored in first to third spaces 511 to 513, and fourth operation data may be stored next in the first space 511 in which the first operation data has been stored. Operation data stored in the particular (or, alternatively, predetermined) allocated space may be updated with new operation data from a fourth draw instruction. For example, the first operation data may be stored in the second space 512, the second operation data may be stored in the third space 513, the third operation data may be stored in the first space 511, and the fourth operation data may be stored in the second space 512, sequentially. If a space is not sufficient to store necessary operation data according to a draw instruction, the GPU may perform a graphics pipeline by using base operation data generated based on a state having high frequency of use from among a plurality of states of a component to minimize traffic. As a result, the GPU may be caused to perform the graphics pipeline with improved efficiency and speed, thereby enabling a computing system that includes the GPU to operate to perform graphics rendering and display, via a graphics pipeline, with improved efficiency and improved performance. Operations of the GPU will be described in detail with reference to FIGS. 6 to 13.

Figure 6:
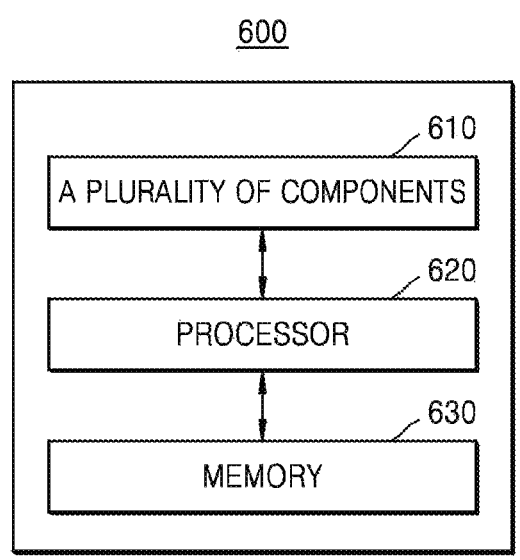
FIG. 6 is a block diagram of a structure of the GPU of FIG. 1.

FIG. 6 is a block diagram of a structure of the GPU 600 of FIG. 6.

Referring to FIG. 6, a GPU 600 may include a plurality of components 610, a processor 620, and a memory 630. However, the elements, shown in FIG. 6, are not essential elements. The GPU 600 may be embodied with more or less elements than the elements shown in FIG. 6. Hereinafter, the components will be sequentially described. The GPU 600 of FIG. 6 may correspond to the GPU 10 of FIG. 1. The plurality of components 610 may be implemented by one or more instances of hardware, including a memory and a processor that may execute one or more programs of instruction stored on the memory to implement the plurality of components.

Each of the plurality of components 610 in the GPU 600 may be implemented to perform a graphics pipeline. Each of the plurality of components 610 may include components configured to be implemented to perform a graphics pipeline including the input assembler 110, the vertex shader 120, the primitive assembler 130, the binner 140, the rasterizer 150, and the fragment shader 160 of FIG. 3, but are not limited thereto. It is to be understood by those skilled in the art that other components configured to be implemented to perform a graphics pipeline may be further included in the plurality of components 610 in addition to the components shown in FIG. 3.

The processor 620 may execute a computer-executable instruction stored in the memory 630. The processor 620 may generate operation data to perform a graphics pipeline based on base operation data representing a base state of the plurality of components 610. The base state indicates a state determined by considering a plurality of states of the plurality of components 610, respectively. For example, a state having the highest use frequency from among the plurality of states of the plurality of components 610 may be set as the base state. The base operation data may include information representing each base state of the plurality of components 610. For example, the base operation data may include an operation code used in each base state of the plurality of components 610.

The processor 620 may generate base operation data based on a state having the highest use frequency from among the plurality of states of the plurality of components 610 when a graphics pipeline is performed.

The processor 620 may obtain first operation data including a first state version code used for performing a graphics pipeline in a first state of the plurality of components 610. Each of the plurality of components 610 may include first to third components. The first state version code may show state information of the first component, state information of the second component, and state information of the third component, in a first state. The first operation data including the first state version code may be obtained from an internal memory or an external memory of the GPU 600.

The processor 620 may update the first operation data with second operation data based on the base operation data. Here, the second operation data may include a second state version code used in a second state of the plurality of components 610. The processor 620 may obtain base operation data of at least one component to be used in a graphics pipeline according to a second state from among pieces of base operation data, and may update data corresponding to at least one component from among pieces of first operation data with base operation data of at least one component. A detailed description thereof will be provided in FIG. 9.

Furthermore, each of the plurality of components 610 may include a plurality of sub components. For example, the GPU 600 may include first and second components. The first component may include first to third sub components, and the second component may include fourth and fifth sub components. Each of the plurality of components 610 may obtain sub operation data including a code used in each state of the plurality of components 610. Each of the plurality of sub components 610 may perform a graphics pipeline according to sub operation data.

The processor 620 may control base operation data to be stored in the memory 630 or a particular (or, alternatively, predetermined) space of each of the plurality of components 610.

The processor 620 may obtain base operation data of at least one component used for determining a second state from among base operation data of each of the plurality of components 610. The processor 620 may update the first operation data with the second operation data based on base operation data of at least one component.

The processor 620 may determine a first component having highest state change frequency from among the plurality of components 610 when a graphics pipeline is performed by the GPU. The processor 620 may set ("generate") base operation data based on an operation code of the first component used in the second state. In more detail, when the operation code of the first component used in the second state is the same as an operation code of the first component used according to a previous draw instruction, the processor 620 may maintain the base operation data. When the operation code of the first component used in the second state is different from the operation code of the first component used according to a previous draw instruction, the processor 620 may update the operation code of the first component with the operation code of the first component used in the second state.

Furthermore, the first component may include a plurality of sub components. The processor 620 may determine a first sub component having highest state change frequency from among the plurality sub components when a graphics pipeline is performed, and may set base operation data based on an operation code of the first sub component used in the second state. In more detail, according to whether the operation code of the first sub component used in the second state is the same as an operation code of a first sub component used according to a previous draw instruction, the processor 620 may maintain or update the base operation data.

The processor 620, based on frequency of use of plural pieces ("instances") of state version data used in each of a plurality of states of the plurality of components 610, may determine a priority of the plural pieces of state version data. State version data indicates data including a state value corresponding to each of the plurality of components 610 when a graphics pipeline is performed. For example, a state value corresponding to a first state of the first component and a state value corresponding to a second state of the second component may be set as first state version data. Plural pieces of state version data may include a code used for performing a graphics pipeline in each of a plurality of states of the plurality of components 610.

The processor 620 may maintain first state version data having the highest priority from among the plural pieces of state version data, and may control second state version data having lower priority than the first state version data to be updated when a graphics pipeline is performed.

The processor 620 may determine state version data to be used in a graphics pipeline, and may perform the graphics pipeline according to the determined data.

The memory 630 may store a computer-executable instruction. The memory 630 may store base operation data and operation data. All of first operation data, second operation data, . . . , and Nth operation data stored in an allocated space of the operation data memory 630 and may be used to perform a graphics pipeline. Furthermore, the memory 630 may store plural pieces of state version data.

The GPU 600 may include a central operation processor to control the overall operations of the plurality of components 610, the processor 620, and the memory 630. The central operation processor may be implemented by an array of a plurality of logic gates, or may be implemented by a combination of the processor 620, which is a general-purpose microprocessor, and the memory 630 storing a program that may be executed in the microprocessor. Also, those of ordinary skill in the art will understand that the central operation processor may also be implemented by other types of hardware.

Various applications or operations performed by the GPU 600 will be described below. However, the features, which may be clearly understood and expected by those of ordinary skill in the art even without specifying any one of the plurality of components 610, the processor 620, and the memory 630, may be understood by general implementation, and the scope of the inventive concepts are not limited by the physical/logical structures or the terms of specific configurations.

Figure 7:
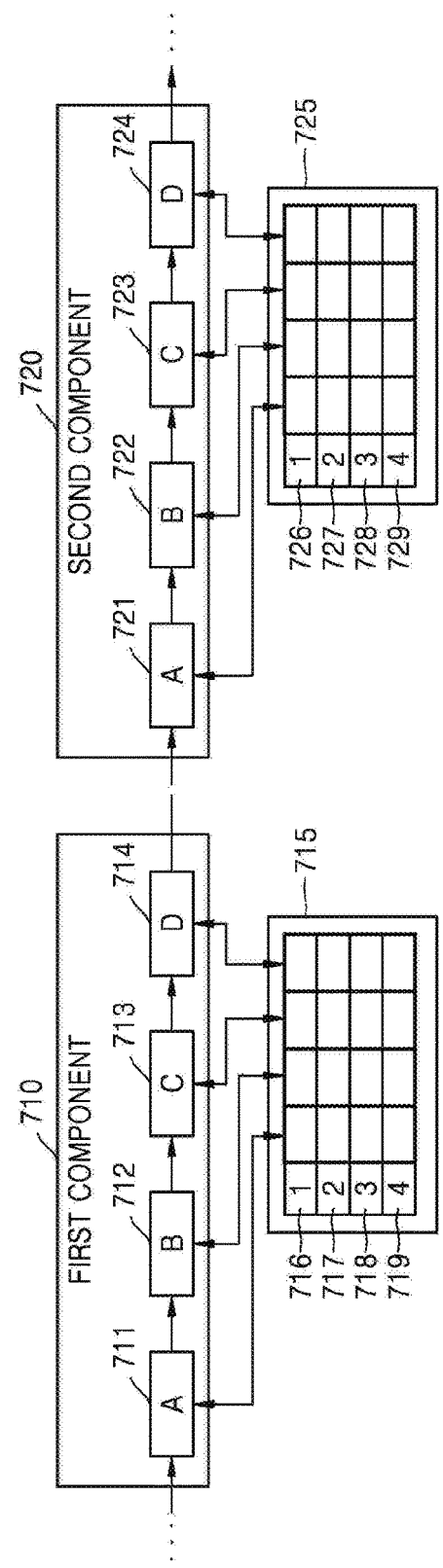
FIG. 7 is a view of a plurality of components configured to be processed by a GPU to perform a graphics pipeline in the GPU.

FIG. 7 is a view of a plurality of components configured to be processed by a GPU to perform a graphics pipeline in the GPU.

Each of the plurality of components in the GPU 10 may be implemented to perform a graphics pipeline based on an instruction stream. Each of the plurality of components may be implemented to perform different functions, respectively. The plurality of components may correspond to the input assembler 110, the vertex shader 120, the primitive assembler 130, the binner 140, the rasterizer 150, and the fragment shader 160 of FIG. 3.

Each component of the plurality of components may include at least one sub component. As illustrated in FIG. 7, a first component 710 may include a first sub component 711, a second sub component 712, a third sub component 713, and a fourth sub component 714. Operation data about ("associated with") a state of the first component 710 may be stored in an internal memory 715 of the GPU or a particular (or, alternatively, predetermined) space of the first component 710. The operation data may include an operation code about a state of the first component 710, and may further include a vector or a value indicating the operation code. It is to be understood by those skilled in the art that the operation data may include other elements in addition to the elements described above.

Furthermore, the operation data may correspond to each of a plurality of sub components. First state version data indicates all operation data about each of a plurality of sub components in a first state of a first component. In addition, a first state version code indicates all operation codes of each of a plurality of sub components in a first state of a first component.

First state version data 716 in a first state of the first component 710, second state version data 717 in a second state, third state version data 718 in a third state, and fourth state version data 719 in a fourth state may be stored in the internal memory 715 of the GPU or the particular (or, alternatively, predetermined) space of the first component 710.

Furthermore, as illustrated in FIG. 7, a second component 720 may include a first sub component 721, a second sub component 722, a third sub component 723, and a fourth sub component 724. Respective pieces of state version data 726 to 729 in a plurality of states of the second component 720 may be stored in an internal memory 725 of the GPU or a particular (or, alternatively, predetermined) space of the second component 720.

The number of sub components of the first component 710 is the same as the number of sub components of the second component 720 in FIG. 7, but the number of sub components of the first component 710 may be different from that of sub components of the second component 720. The first component 710 and the second component 720 may be stored in different spaces of different sizes.

Figure 8:
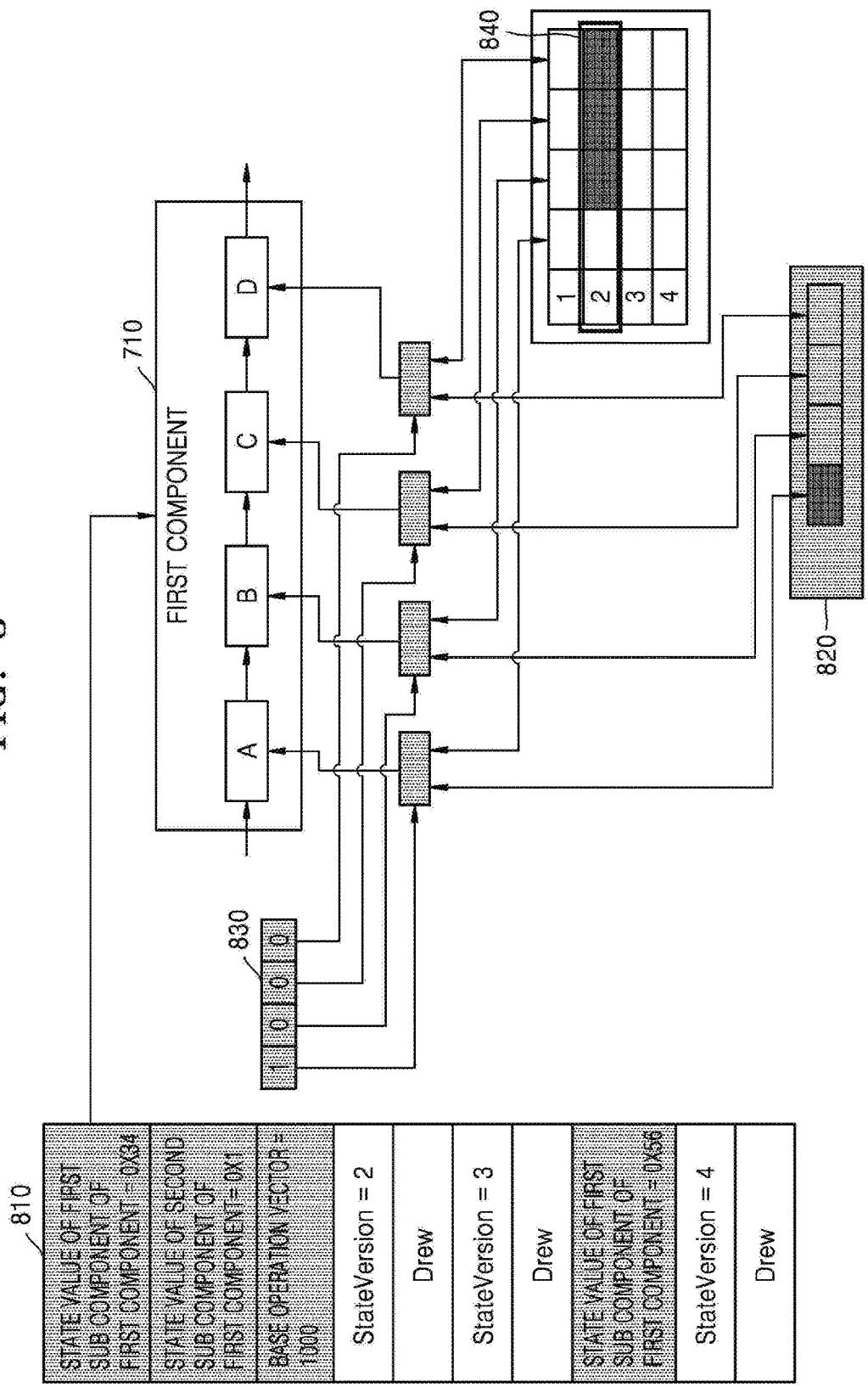
FIG. 8 is a view illustrating a method of operating a GPU according to some example embodiments.

FIG. 8 is a view illustrating a method of operating a GPU according to some example embodiments.

FIG. 8 is a view illustrating a process of implementing a first component of the GPU to perform a graphics pipeline according to an instruction stream 810.

The instruction stream 810 may include information associated with setting ("generating") base operation data, base operation vector information, state version data information to be used for performing a graphics pipeline, and information of draw instruction data, but is not limited thereto.

The base operation data may include a base state of a plurality of components. For example, the GPU may determine a state having the highest use frequency from among states of the plurality of components when a graphics pipeline is performed, and may generate base operation data including a code representing the state having the highest use frequency.

A base operation vector indicates information associated with selecting data used for performing a graphics pipeline from among pieces of base operation data.

State version data includes information indicating a state value of each of a plurality of components when a graphics pipeline is performed. As illustrated in FIG. 8, first state version data with respect to a first component may include information indicating a state value of each of a plurality of sub components of the first component. In more detail, first state version data with respect to first component may include information indicating a state value of each of first to fourth sub components in a first state. Furthermore, second state version data with respect to the first component may include information indicating a state value of each of first to fourth sub components in a second state.

Draw instruction data includes information associated with each draw instruction.

As illustrated in FIG. 8, the GPU may obtain base operation data 820 representing a base state of a plurality of sub components. The base operation data 820 may be generated based on a value of state of a sub component having the highest use frequency when a graphics pipeline is performed. For example, the GPU may set a base state value of the first sub component as 0x34, and may set a base state value of the second sub component as 0x1. Base state values of the third and fourth sub components may be the same as preset base state values.

As illustrated in FIG. 8, the GPU may obtain first sub operation data 840 including a first state version code with respect to a plurality of sub components in a first state of the first component. The GPU may obtain second sub operation data including a second state version code with respect to a plurality of sub components in a second state of the first component.

As illustrated in FIG. 8, the GPU may obtain base operation data of at least one sub component used for determining a state of the first component from among pieces of base operation data. The GPU may obtain information of the base state value of the first sub component by using a base operation vector 830. When the base operation vector 830 is (1,0,0,0), the GPU may obtain information of the base state value of the first sub component from among the first to fourth sub components.

Referring to FIG. 8, the GPU updates the base state value of the first sub component with a state value of the first sub component and uses state values of second to fourth sub components included in the second sub operation data without change, and thus, may obtain sub operation data of the first component. The GPU may perform a graphics pipeline according to the obtained sub operation data of the first component.

If only a state of the first sub component of the first component is continuously changed, the GPU maintains the existing state values of the second to fourth sub components and updates only the state value of the first sub component, thereby performing a graphics pipeline. As a result, the GPU may prevent unnecessary updating of all state version data, which may increase a speed of performing a graphics pipeline.

FIG. 8 shows a process of performing a graphics pipeline of the first component. Other components of the GPU may also perform a graphics pipeline by using the same method as that used in the first component.

Figure 9:
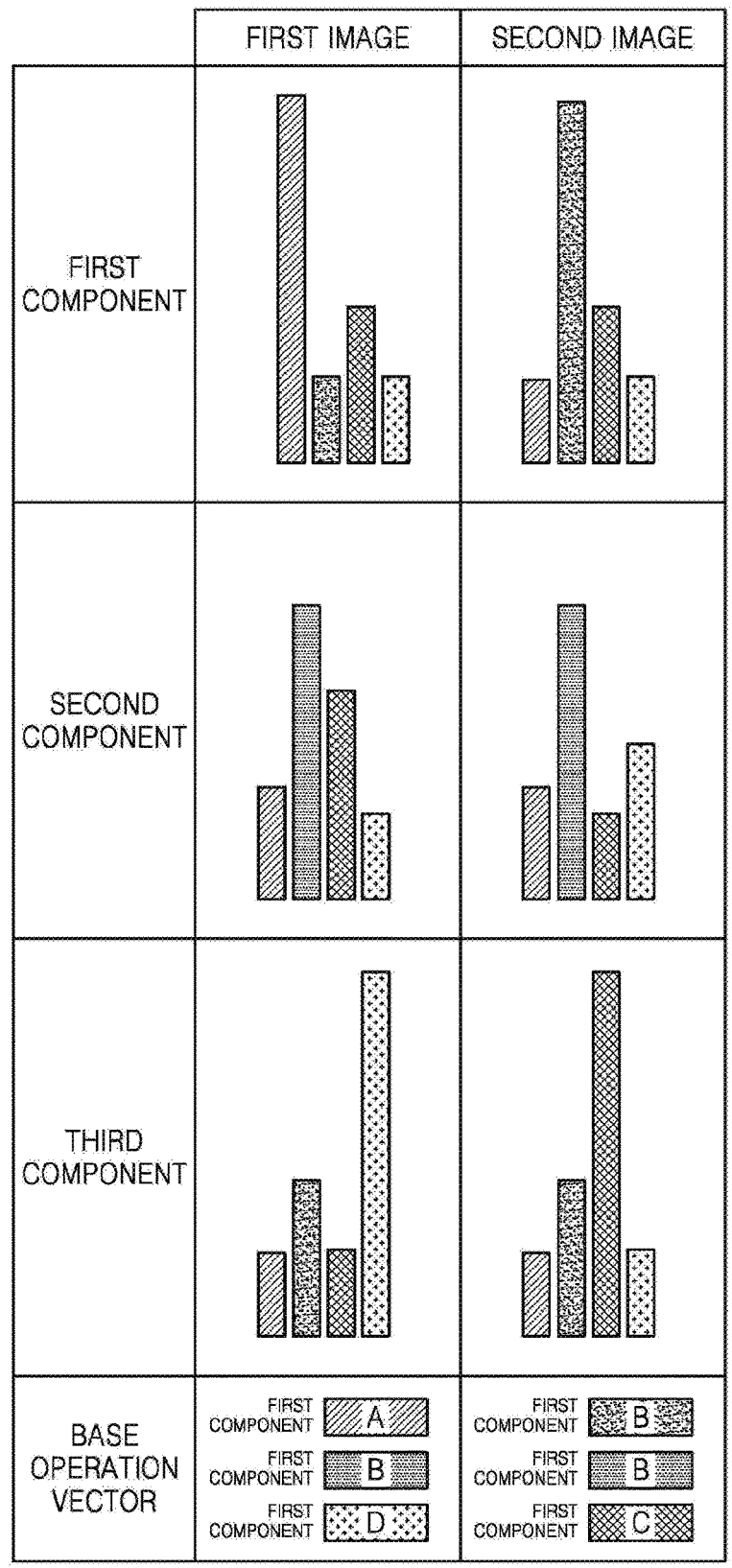
FIG. 9 is a view illustrating a process of setting base operation data according to frequency of use of state data corresponding to each of a plurality of components, according to some example embodiments.

FIG. 9 is a view illustrating a process of setting base operation data according to frequency of use of state data corresponding to each of a plurality of components, according to some example embodiments.

A GPU may set ("generate") the most frequently used state value of each component as base operation data by analyzing a plurality of draws forming an image.

As illustrated in FIG. 9, the GPU may determine the most frequently used state value of a first component as A by analyzing a plurality of draws forming a first image. Similarly, the GPU may obtain base operation data by setting a state value of a second component as B and a state value of a third component as D.

In addition, the GPU may obtain base operation data based on the most frequently used state value of each component by analyzing a plurality of draws forming a second image. The GPU may obtain base operation data by setting state values of the first and second components as B, and a state value of the third component as C.

Figure 10:
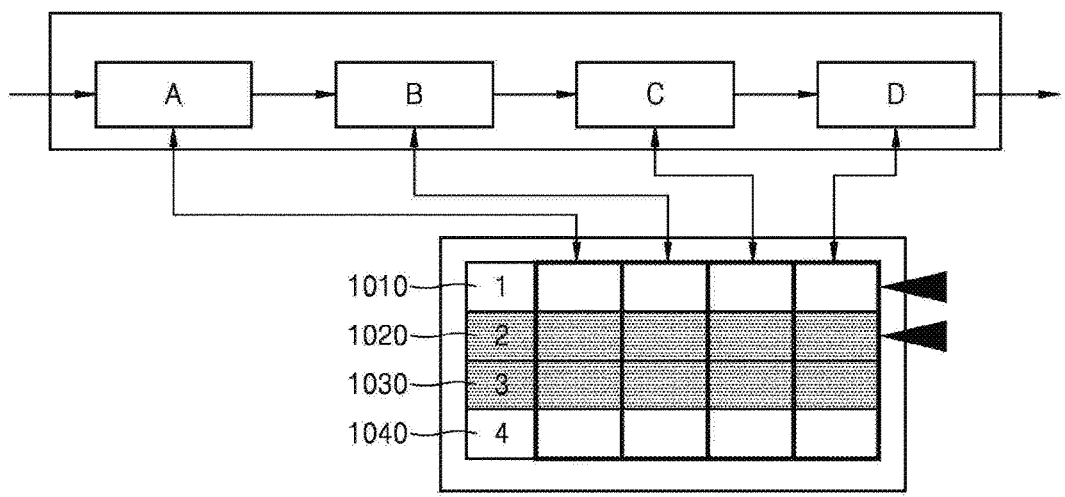
FIG. 10 is a view illustrating a method of processing state version data of a GPU according to frequency of use of state version data corresponding to each of a plurality of components, according to some example embodiments.

FIG. 10 is a view illustrating a method of processing state version data of a GPU according to frequency of use of state version data corresponding to each of a plurality of components, according to some example embodiments.

The GPU may perform a graphics pipeline based on frequency of use of state version data corresponding to each of a plurality of components.

Referring to FIG. 10, it is assumed that use frequencies of first state version data 1010 and second state version data 1020 are high and use frequencies of third state version data 1030 and fourth state version data 1040 are low when the GPU performs a graphics pipeline. The GPU may maintain the first and second state version data 1010 and 1020 (e.g., refrain from updating the first and second state version data 1010 and 1020), and may update the third and fourth state version data 1030 and 1040 with other state version data used for performing a graphics pipeline.

The GPU may perform a graphics pipeline by updating only state version data with a low use frequency with new state version data and reusing state version data with a high use frequency. As referred to herein, use frequency may be determined to be "low use frequency" based on a determination that the use frequency is less than a particular use frequency threshold value; use frequency may be determined to be "high use frequency" based on a determination that the use frequency is equal to or greater than a particular use frequency threshold value.

Figure 11:
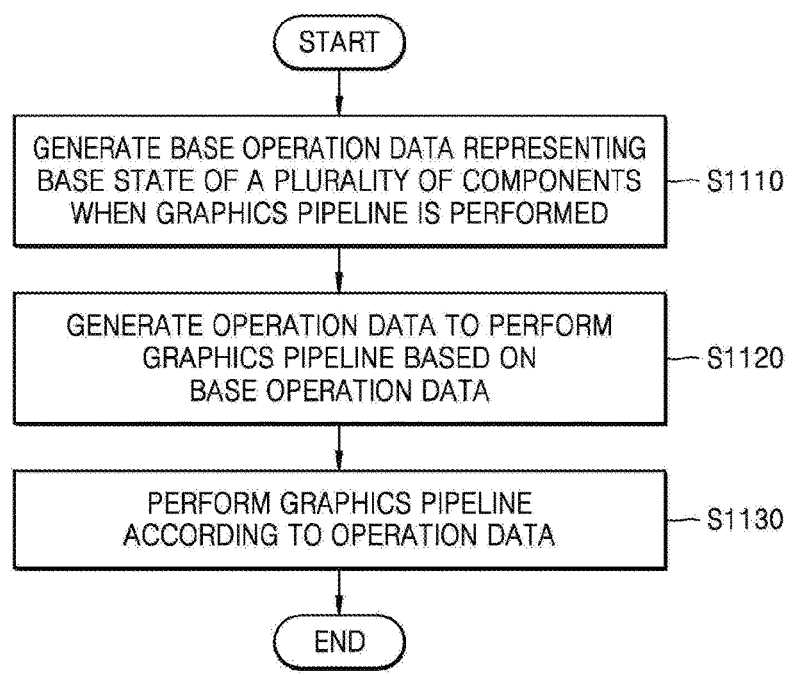
FIG. 11 is a flowchart of a method of operating a GPU according to some example embodiments.

FIG. 11 is a flowchart of a method of operating a GPU according to some example embodiments.

Referring to FIG. 11, in operation S1110, the GPU may generate base operation data representing a base state of a plurality of components based on state change frequencies of a plurality of components.

The GPU may generate base operation data based on a state having the highest change frequency from among the states of the plurality of components when a graphics pipeline is performed.

In operation S1120, the GPU may generate operation data to perform a graphics pipeline based on the base operation data.

Each of the plurality of components may include a plurality of sub components. The GPU may control each of the plurality of components in such a manner that each of the plurality of components obtains sub operation data used for performing a graphics pipeline.

The GPU may store the base operation data in a memory or a particular (or, alternatively, predetermined) space of each of the plurality of components.

The GPU may obtain base operation data of at least one component used for determining a second state from among base operation data of each of the plurality of components.

In operation S1130, the GPU may perform a graphics pipeline according to the generated operation data. Furthermore, the GPU may control each of the plurality of components in such a manner that each of the plurality of components performs a graphics pipeline according to the sub operation data.

The GPU may update first operation data with second operation data based on base operation data of at least one component. The GPU may store the updated second operation data. The GPU may perform a graphics pipeline according to the updated second operation data.

Figure 12:
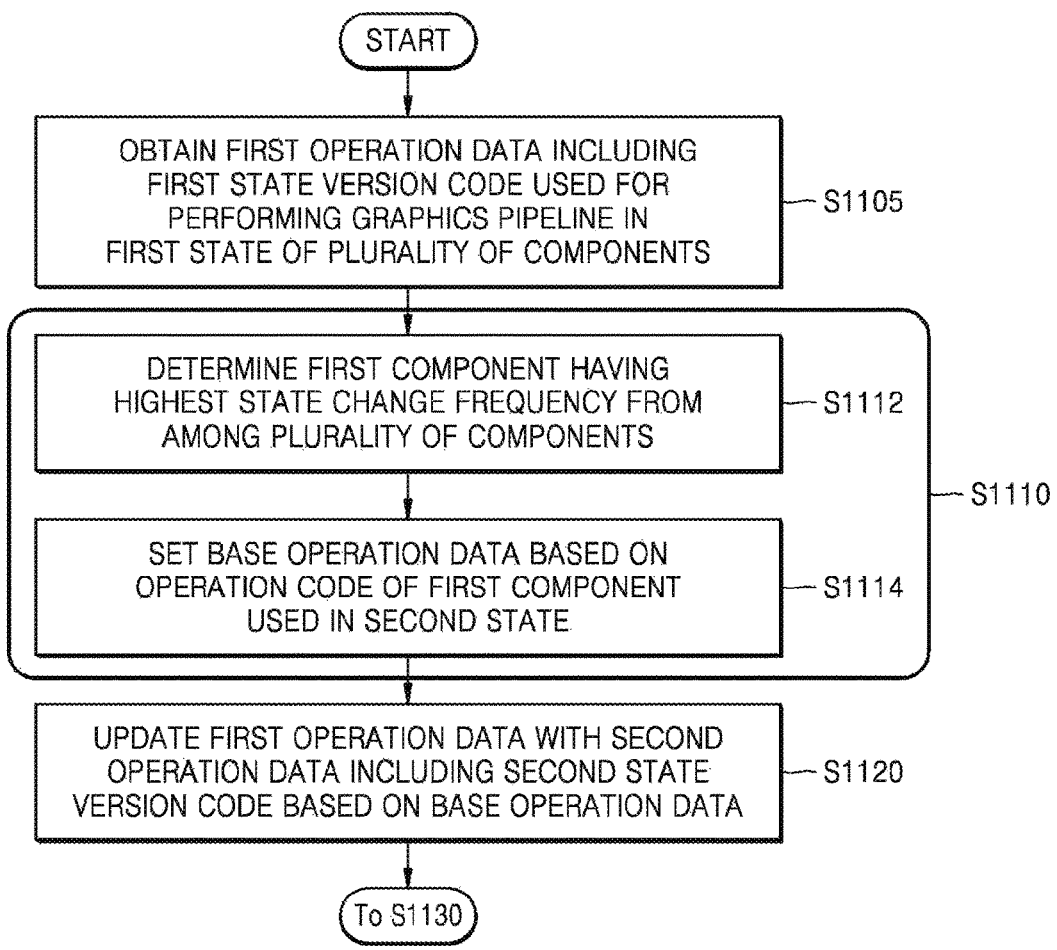
FIG. 12 is a flowchart of a method of operating a GPU of FIG. 13 according to some example embodiments.

FIG. 12 is a flowchart of a method of operating the GPU of FIG. 11 according to some example embodiments.

Referring to FIG. 12, in operation S1105, the GPU may obtain first operation data including a first state version code used for performing a graphics pipeline in a first state of the plurality of components.

In operation S1112, the GPU may determine a first component having highest state change frequency from among the plurality of components when a graphics pipeline is performed.

Furthermore, the first component may include a plurality of sub components. The GPU may determine a first sub component having highest state change frequency from among the plurality of sub components when a graphics pipeline is performed.

In operation S1114, the GPU may set base operation data based on an operation code of the first component used in a second state. Furthermore, the GPU may set base operation data based on an operation code of the first sub component used in the second state.

In operation S1120, the GPU may update the first operation data with second operation data including a second state version code based on the base operation data.

Figure 13:
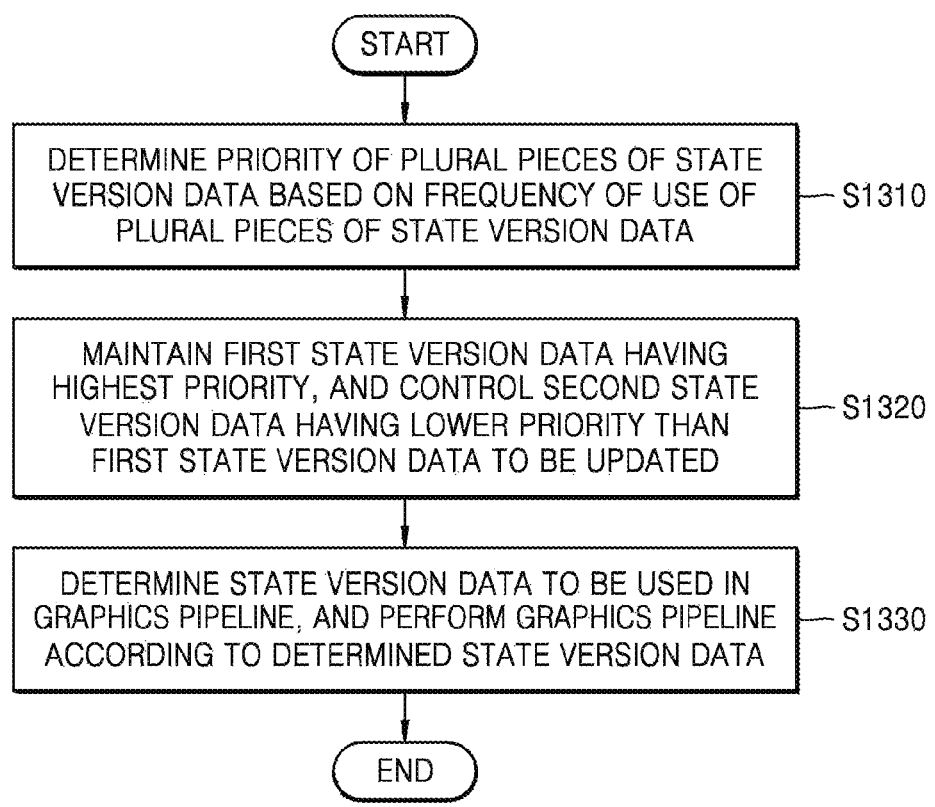
FIG. 13 is a flowchart of a method of operating a GPU according to some example embodiments.

FIG. 13 is a flowchart of a method of operating a GPU according to some example embodiments.

Referring to FIG. 13, in operation S1310, the GPU may determine a priority of plural pieces of state version data based on frequency of use of the plural pieces of state version data.

In operation S1320, the GPU, based on priority, may maintain first state version data having the highest priority, and may control second state version data having lower priority than the first state version data to be updated when a graphics pipeline is performed.

In operation S1330, the GPU may determine state version data to be used in a graphics pipeline, and may perform the graphics pipeline according to the determined state version data.

The above-described devices may be implemented by hardware components, software components, and/or any combination thereof. For example, the devices and components described in the example embodiments may be implemented by using processors, arithmetic logic units (ALUs), digital signal processors, microcomputers, field programmable arrays (FPAs), programmable logic units (PLUs), microprocessors, one or more general-purpose computers or special-purpose computers, or any other devices that may execute and respond to instructions.

The processing device may execute an operating system (OS) and one or more software applications executed in the OS. Also, the processing device may access, store, operate, process, and generate data in response to the execution of software.

For convenience of understanding, it may be described that one processing device is used. However, those or ordinary skill in the art will understand that the processing device may include a plurality of processing elements and/or various types of processing elements. For example, the processing device may include a plurality of processors or a processor and a controller. Also, the processing device may include any other processing configurations such as parallel processors.

The software may include computer programs, codes, instructions, or any combination thereof, and may construct the processing apparatus for desired operations or may independently or collectively command the processing apparatus.

In order to be interpreted by the processing apparatus or to provide commands or data to the processing device, the software and/or data may be permanently or temporarily embodied in any types of machines, components, physical devices, virtual machines, computer storage media, or transmitted signal waves. The software may be distributed over network coupled computer systems so that it may be stored and executed in a distributed fashion. The software and data may be stored in one or more computer-readable recording mediums.

Some example embodiments may be implemented in a form of executable program command through a variety of computer means recordable to computer-readable media. The computer-readable medium may include program commands, data files, data structures or a combination thereof. Program instructions recorded on the medium may be particularly designed and structured for example embodiments or available to those skilled in computer software.

Examples of the computer-readable recording medium include magnetic media, such as a hard disc, a floppy disc, and a magnetic tape; optical media, such as a compact disc-read only memory (CD-ROM) and a digital versatile disc (DVD); magneto-optical media, such as floptical discs; a ROM; a RAM; and a flash memory.

Program commands may include, for example, a high-level language code that can be executed by a computer using an interpreter, as well as a machine language code made by a complier.

The above hardware devices may be configured to operate as one or more software modules to perform the operations of the example embodiments, and vice versa.

It should be understood that embodiments described herein should be considered in a descriptive sense only and not for purposes of limitation. Descriptions of features or aspects within each example embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A graphics processing unit (GPU) comprising:
   a memory configured to store computer-executable instructions; and
   at least one processor configured execute the computer-executable instruction to
      determine a state having a highest use frequency from among a plurality of states of a plurality of components when a graphics pipeline is performed,
      generate base operation data associated with a base state of the plurality of components, the base operation data including a code representing the determined state having the highest use frequency,
      generate a set of operation data associated with the graphics pipeline based on the base operation data, and
      implement the plurality of components to perform the graphics pipeline according to the generated set of operation data.

2. The GPU of claim 1, wherein the at least one processor is configured to execute the computer-executable instructions to
   receive first operation data including a first state version code associated with performing the graphics pipeline in a first state of the plurality of components, and
   update the first operation data with second operation data, the second operation data including a second state version code based on the base operation data, the second state version code associated with a second state of the plurality of components.

3. The GPU of claim 2, wherein the at least one processor is configured to execute the computer-executable instructions to
   receive base operation data of at least one component associated with determining the second state from among base operation data of each of the plurality of components, and update the first operation data with the second operation data based on the base operation data of the at least one component.

4. The GPU of claim 3, wherein the at least one processor is configured to execute the computer-executable instructions to determine a first component having a highest state change frequency from among the plurality of components, and generate the base operation data based on an operation code of the first component used in the second state.

5. The GPU of claim 4, wherein the first component includes a plurality of sub components, and is configured to be implemented to cause the at least one processor to execute the computer-executable instructions to determine a first sub component having a highest state change frequency from among the plurality sub components, and generate the base operation data based on an operation code of the first sub component used in the second state.

6. The GPU of claim 2, wherein the memory is configured to store the updated second operation data, and each component of the plurality of components is configured to be implemented to cause the at least one processor to execute the computer-executable instructions to perform the graphics pipeline according to the updated second operation data.

7. The GPU of claim 1, wherein each component of the plurality of components includes a plurality of sub components, and each component of the plurality of components is configured to be implemented to cause the at least one processor to execute the computer-executable instructions to obtain sub operation data including a code associated with each state of the plurality of components, and each sub component of the plurality of sub components is configured to be implemented to cause the at least one processor to execute the computer-executable instructions to perform the graphics pipeline according to the sub operation data.

8. The GPU of claim 1, wherein the at least one processor is configured to execute the computer-executable instructions to cause the base operation data to be stored in the memory.

9. A graphics processing unit (GPU) comprising:

a memory configured to store computer-executable instructions and a plurality of instances of state version data including a code associated with performing a graphics pipeline in each of a plurality of states of a plurality of components; and at least one processor configured to execute the computer-executable instructions stored in the memory to determine a priority of the plurality of instances of state version data based on frequencies of use associated with the plurality of instances of state version data, maintain first state version data having a determined highest priority from among the plurality of instances of state version data stored in the memory, and control second state version data having a determined lower priority than the first state version data to be updated based on the graphics pipeline being performed.

10. The GPU of claim 9, wherein the at least one processor is configured to execute the computer-executable instructions stored in the memory to determine state version data associated with the graphics pipeline, and perform the graphics pipeline according to the determined state version data.

11. A graphics processing unit (GPU) comprising:

a memory configured to store computer-executable instructions; and a processor configured execute the computer-executable instructions to control a plurality of instances of state version data associated with performing a graphics pipeline in a plurality of states of a plurality of components, the controlling including maintaining first state version data having a determined frequency of use, associated with the plurality of instances of state version data, that at least meets a threshold frequency value, and updating second state version data based on the graphics pipeline being performed, the second state version data having a determined frequency of use that is less than the threshold frequency value.

12. The GPU of claim 11, wherein the processor is configured to execute the computer-executable instructions to determine state version data associated with the graphics pipeline, and perform the graphics pipeline according to the determined state version data.

13. The GPU of claim 11, wherein the processor is configured to execute the computer-executable instructions to generate base operation data based on identifying a state having a highest use frequency from among the plurality of states of the plurality of components.

14. The GPU of claim 13, wherein the processor is configured to execute the computer-executable instructions to receive first operation data including a first state version code associated with performing the graphics pipeline in a first state of the plurality of components, and update the first operation data with second operation data, the second operation data including a second state version code based on the base operation data, the second state version code associated with a second state of the plurality of components.

15. The GPU of claim 14, wherein the processor is configured to execute the computer-executable instructions to receive base operation data of at least one component associated with determining the second state from among base operation data of each component of the plurality of components, and update the first operation data with the second operation data based on the base operation data of the at least one component.

16. The GPU of claim 15, wherein the processor is configured to execute the computer-executable instructions to determine a first component having a highest state change frequency from among the plurality of components, and generate the base operation data based on an operation code of the first component used in the second state.

17. The GPU of claim 14, wherein
the memory is configured to store the updated second operation data, and
the processor is configured to execute the computer-executable instructions to perform the graphics pipeline according to the updated second operation data.

18. The GPU of claim 13, wherein the processor is configured to execute the computer-executable instructions to cause the base operation data to be stored in the memory.

19. The GPU of claim 11, wherein
each component of the plurality of components includes a plurality of sub components, and
the processor is configured to execute the computer-executable instructions to implement each component of the plurality of components to
obtain sub operation data including a code associated with each state of the plurality of components, and
perform the graphics pipeline according to the sub operation data.

* * * * *